United States Patent [19]

Heiting

[11] Patent Number: 4,647,441

[45] Date of Patent: Mar. 3, 1987

[54] METHOD FOR THE REGENERATION OF WASHING SOLUTION UTILIZED FOR SIMULTANEOUS WASHING OF NITROUS OXIDE AND SULFUR DIOXIDE FROM EXHAUST GASES

[75] Inventor: Bernd Heiting, Essen, Fed. Rep. of Germany

[73] Assignee: Krupp-Koppers GmbH, Essen, Fed. Rep. of Germany

[21] Appl. No.: 738,734

[22] Filed: May 29, 1985

[30] Foreign Application Priority Data

Sep. 26, 1984 [DE] Fed. Rep. of Germany ....... 3435222

[51] Int. Cl.[4] .................... C01B 21/00; C01B 17/00; C05C 7/00
[52] U.S. Cl. .................................. 423/235; 423/242; 71/54
[58] Field of Search ................... 423/235, 235 D, 239, 423/239 A, 242 R, 413

[56] References Cited

U.S. PATENT DOCUMENTS 4,055,623 10/1977 Saitoh et al. .................. 423/235
4,255,401 3/1981 Nomoto et al. ................ 423/235

FOREIGN PATENT DOCUMENTS 53-10375 1/1978 Japan .............................. 423/235

*Primary Examiner*—Gregory A. Heller
*Attorney, Agent, or Firm*—Michael J. Striker

[57] ABSTRACT

In a method for the regeneration of washing solution, which is used for washing nitrous oxide and sulfur dioxide out from exhaust gases, a portion of the washing solution containing a complex-forming substance, which is Iron (II)-chelate complex of ethylenediaminotetraacetic acid (EDTA), is removed from the washing solution flowing in a closed circuit, and imidodisulfonate in this portion is separated from the washing solution and is further used as a commercial product.

4 Claims, 1 Drawing Figure

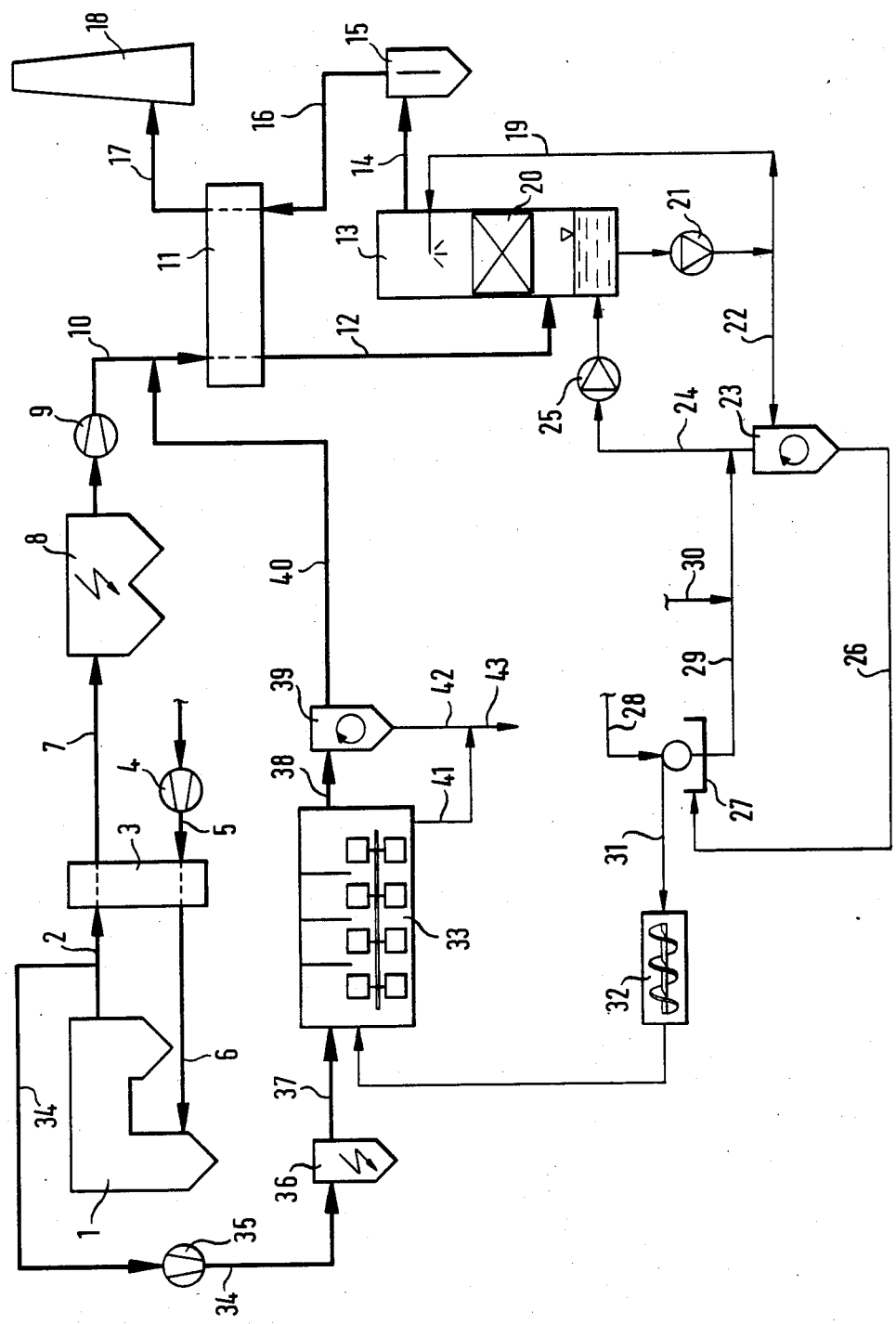

METHOD FOR THE REGENERATION OF WASHING SOLUTION UTILIZED FOR SIMULTANEOUS WASHING OF NITROUS OXIDE AND SULFUR DIOXIDE FROM EXHAUST GASES

BACKGROUND OF THE INVENTION

The present invention relates to a method of regenerating a washing solution, which contains Iron (II)-chelate complex of ethylenediaminotetraacetic acid (EDTA) as a complex-forming substance, and is used for a simultaneous washing of nitric oxide and sulfur dioxide out of exhaust gases.

Due to a more and more intensive environment contamination various efforts have been made to avoid emission of sulfur dioxide and nitric oxide. This is particularly important for large heating installations, such as power plants. It is, for example provided that for all new installations of power plants, the output of which exceeds 300 MW, the amount of NOx-output should be limited to 200 mg/m$^3$. However, research conducted up to now has failed to offer a method which would enable a complete removal of the above noxious materials from exhaust gas.

It has been already suggested to carry out the washing of exhaust gas with a washing solution which contains, as a complex-forming substance, Iron (II)-chelate compound of ethylenediaminotetraacetic acid (EDTA). Here sulfur dioxide in the watery agent of the washing solution is bound under the formation of sulfurous acids or salts according to the following reaction:

$$SO_2 + H_2O \rightleftharpoons H_2SO_3$$

The washing solution according to p$^H$-value results in the formation of hydrogensulfite (p$^H \leq 5$) or sulfate (p$_H \geq 9$). Thus during the washing of the exhaust gas the gas is treated in weak acid agents (p$^H$ 5–7). At the same time nitric oxide is bound by Iron (II)-chelate compound of ethyleneaminotetraacetic acid (EDTA) contained in the washing solution according to the following reaction:

$$Fe^{2+} - EDTA + NO \rightleftharpoons Fe^{2+} - EDTA \times NO$$

This means that the advantage of such a method resides in that a simultaneous washing of nitric oxide and sulfur dioxide out of the exhaust gas is possible in a single apparatus. In connection with this washing, NO-molecules deposited on Iron (II)-chelate complex are transmitted by ions of sulfite and hydrogen sulfite, contained in the washing solution, after the separation from the complex, into sulfur and nitrogen compounds whereas simultaneously the Iron (II)-chelate complex is regenerated or efficiently renewed.

Research has shown that even small amounts in other nitrogen - sulfur compounds substantially result in imidodisulfonate NH (SO$_3$)$_2{}^{2-}$. The following reaction, for example, takes place:

$$2NO + 5HSO_3{}^- \rightarrow 2NH(SO_3)_2{}^{2-} + H_2SO_4{}^- + H_2O$$

If p$^H$ value of the washing solution is >7 NO$_2$ is formed, which escapes in gaseous state. Therefore, as has been noted above, it is important to carry out an exhaust gas washing in a weak acid agent and to thereby avoid the N$_2$O-formation.

Inasmuch as the washing solution normally flows through a circuit it becomes in time enriched with imidodisulfonate which can specifically lead to damaging of the washing process due to the separation of crystallized imidodisulfonate. It is therefore required to undertake suitable measures, which would ensure that this undesired enrichment of imidodisulfonate in the washing solution be avoided and resulting disturbances be prevented.

SUMMARY OF THE INVENTION

It is an object of the present invention to provide an improved method for the regeneration of a washing solution used for washing exhaust gases.

It is another object of the invention to provide an effective washing solution-regeneration method, in which it would be considered that the discharge of a used washing solution into the main canal would not be possible because of the high content of noxious materials in the used washing solution.

Also with such methods, where, for example noxious materials are removed by a thermal decomposition of noxious substances, the proposed method can be utilized because, with the above noted method the situation may occur, in which the expenses on the regeneration of the washing solution could exceed the costs on the gas washing.

These and other objects of the present invention are attained by a method for the regeneration of washing solution which contains Iron II-chelate complex of ethylenediaminotetraacetic acid (EDTA) as a complex-forming substance and is used for a simultaneous washing of nitric oxide and sulfur dioxide out of exhaust gases, the method comprising the steps of branching a partial flow of a washing solution from the washing solution flowing in a closed cycle; separating imidodisulfonate contained in said partial flow from the same; and, after at least a single washing of imidodisulfonate, feeding the latter for a further commercial use while introducing the partial flow, freed from imidodisulfonate, back into the closed cycle to compensate for losses of the complex-forming substance and alkali ions.

Between 0.3 and 3.0 volume percent of the washing solution may be removed from the washing solution flowing in the closed cycle for the separation of imidodisulfonate therefrom.

Imidodisulfonate can be subjected to a multiple washing.

The method of this invention in fact resides in that imidodisulfonate, separated from the washing solution, can be disintegrated by means of very small amounts of nitrogen-sulfur-compounds and can be transferred by suitable means into a commercially usable product so that costs of the regeneration of the washing solution in the whole process would not increase but would be substantially reduced because of producing a valuable by-product.

Three various modifications of the regeneration process of this invention are herein suggested.

The first version of the method resides in that imidodisulfonate, washed in a washing step, is subjected to hydrolysis in acid solution of amidosulfonic acid. The reaction is as follows:

$$NH(SO_3H)_2 \xrightarrow[-H_2SO_4]{+H_2O} NH_2(SO_3H)$$

The so-produced amidosulfonic acid NH$_2$ (SO$_3$H) presents a marketable product which is used as a so-called hard acid (disintegration point 205°) in the chemical industrie in place of other fluid acids, particularly in place of sulfuric acids. Normally, at the present time if amidosulfonic acid is obtained in conversion of its hydrolysis reaction from ammonium and sulfuric acid it results in relatively high production costs. However, according to the method of this invention amidosulfonic acid, obtained as a by-product, can meet competition prices on the market.

A second modification of the method of this invention resides in that ammonium is utilized as an alkaline component in the washing solution, and wherein ammonium imidodisulfonate, contained in said partial flow and separated therefrom and washed in the washing step, is used as a mineral fertilizer, which can be used in agriculture. With a nitrogen content of about 21% ammonium imidodisulfonate NH (SO$_3$NH$_4$)$_2$ is comparable with other nitrogen-containing fertilizers, such as lime ammonia saltpetre or ammoniasulfate nitrate.

A third modification of the method according to the invention resides in that the separated and washed imidodisulfonate is decomposed by treating thereof with hot exhaust gases having temperature from 350° to 400° C., and a remaining sulfate-sulfite mixture is separated and converted into gypsum whereas a sulfurdioxide and nitrogen-containing gas, obtained in a decomposition reaction, is added to the exhaust gases before the latter enter a gas washer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a flow chart diagram illustrating the method of the regeneration of washing solution according to the invention.

DETAILED DESCRIPTION OF THE PREFERRED EMBODIMENTS

Referring now to the drawing in detail the flow chart diagrammatically shows an installation for the treatment of 10$^6$m$^3$/h of exhaust gas. The exhaust gas derives from a boiler 1 of the power plant, from which gas at the temperature of about 400° C. is discharged via a conduit 2 into an air preheater 3. The hot exhaust gas is cooled down in the air preheater 3 to the temperature of 140° C. while simultaneously air, which passes through a blower 4 and a conduit 5, enters the preheater 3 and is heated-up there from 30° C. to 350° C. Then the so-heated air, as a combustion air, is introduced via a conduit 6 into the boiler 1. Exhaust gas at this time flows through a conduit 7 into an electrostatic precipitator or filter 8 in which dust is removed from gas. Thereafter gas is conveyed through a blower 9 and a conduit 10 into a gas preheater 11, in which gas is cooled down to 95° C. The exhaust gas, having such a temperature enters via a conduit 12 the lower part of a filling material-washer 13 in which a simultaneous washing of nitric oxide and sulfur dioxide in accordance with the method described herein above takes place. The exhaust gas freed from these ingredients, is discharged from the washer 13 via a conduit 14 and is conveyed through a drip separator 15, from which the gas is transported through a conduit 16 into the gas preheater 11. The exhaust gas is again heated up from 48° C. to 100° C. and at this temperature is then fed via a conduit 17 into a chimney 18. The repeated heating-up of the refined exhaust gas is herein required in order to enable gas, flowing through the chimney, to exit into higher air layers.

A required washing solution at the amount of 150,000 m$^3$/h is fed, via a circuit conduit 19, from above into the filling material packing 20 of washer 13 so that the exhaust gas and the washing solution flow in counter directions relative to each other. The washing solution, discharged from the bottom of washer 13, is forced back by means of a pump 21 into the conduit 19. About 50$^{m3}$/h, also 0.3 volume percent, of the washing solution flowing through the circuit, is branched off the circuit and is fed via a conduit 22 into a hydrocyclone 23, in which imidodisulfonate, contained in this partial flow of the washing solution, is separated from the washing solution. The washing solution, freed from imidodisulfonate, is then further conveyed via a conduit 24 and pump 25 into a sump of the filling material-washer 13. The imidodisulfonate meanwhile is fed through a conduit 26 into a revolving filter 27, in which imidodisulfonate is refined by a single or multiple washing. A fresh water supply required for this washing is provided via a conduit 28 whereas used water is discharged from the revolving filter 27 through a conduit 29 and is added to the washing solution in the conduit 24.

In order to compensate for losses of a complex-forming substance required amounts of Fe(II)-EDTA as well as Na and K ions from gypsum deposits are added to the water in conduit 29 through a conduit 30.

The refined imidodisulfonate is meanwhile fed via a conduit 31 from the revolving filter 27 and is introduced, by means of a dosing screw conveyer 32, in the amount of about 5 t/h with water content of 10 weight percent, into a centrifugal drier 33. To heat up the refined imidodisulfonate a partial flow of 50,000$^{m3}$/h of hot exhaust gas is branched from the conduit 2 into a conduit 34 and is forced by means of a blower 35 into an electrostatic filter 36. Then the partial flow of the exhaust gas, freed from dust in the filter 36 and having the temperature of about 400° C., is fed into the centrifugal drier 33, in which, due to high temperature, imidodisulfonate is disintegrated. The disintegration of, for example potassium imidodisulfonate takes place according to the following reaction:

$$2NH\ (SO_3K)_2 \xrightarrow{400°\ C.} 2SO_2 + K_2SO_4 + H_2O + N_2$$

The sulfurdioxide and nitric oxide-containing exhaust gases of the decomposition reaction are discharged from the centrifugal drier 33 via a conduit 38 and fed via a cyclone 39 into a conduit 40 which opens into the conduit 10. The exhaust gas flowing through conduit 40 and having the temperature of about 360° C. is added to the gas stream in conduit 10 before the gas preheater 11. The sulfate-sulfite mixture, deposited as a solid decomposition product, is discharged via conduits 41 and 42 from the centrifugal drier 33 and cyclone 39, respectively, and fed via a conduit 43 to a further treatment installation which is conventional and not shown in the drawing. Here, firstly, with the addition of water, sulfite is oxidized by air oxygen into sulfate. Then sulfate is deposited as gypsum, due to the addition of lime, whereas released alkali ions can be fed back into the circuit via the conduit 30 for compensating for ion losses in the washing solution, as has been described above. A temporarily operated drier can be used as the centrifugal drier 33, in which reaction agents would be fed into a direct gas flow. Duration of the treatment in the drier amounts to about 8 to 13 seconds, depending on the size of the apparatus. If the imidodisulfonate, introduced into the circuit as a conveying material, contains also small amounts of other sulfur-nitrogen compounds these compounds are also decomposed during the chemical treatment in analogous fashion.

Of course, the above-described diagram for the method of the regeneration of washing solution can be modified to be used for both above method versions. Imidodisulfonate, discharged from the revolving filter 27 via conduit 31, is fed for a further treatment while a portion of hot exhaust gas is withdrawn from conduit 2 via the conduit 34.

It will be understood that each of the elements described above, or two or more together, may also find a useful application in other types of methods for the regeneration of washing solution in a washing of exhaust gases differing from the types described above.

While the invention has been illustrated and described as embodied in a method for the regeneration of washing solution in a washing of exhaust gases, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic of specific aspects of this invention.

What is claimed as new and desired to be protected by Letters Patent is set forth in the appended claims:

1. A method of the regeneration of a washing solution containing Iron II-chelate complex of ethylenediaminotetraacetic acid (EDTA) utilized as a complex-forming substance and used for a simultaneous washing of nitric oxide and sulfur-dioxide out of exhaust gases, the method comprising the steps of providing circulation of the washing solution in a closed cycle; wherein the exhaust gases pass through a washer in which the nitric oxide and sulfur dioxide are washed out from the exhaust gases and a washing solution containing imidodisulfonate results from a reaction between nitric oxide and sulfur dioxide in said washer branching a partial flow of the washing solution containing imidodisulfonate from the washing solution circulated in said closed cycle; separating imidodisulfonate contained in said partial flow from the same;

subjecting imidodisulfonate to at least a single washing while introducing the partial flow, freed from imidodisulfonate, back into the closed cycle to compensate for losses of the complex-forming substance and alkali ions then feeding; and subjecting the imidodisulfonate, washed in said at least single washing to hydrolysis in acid solution of amidosulfonic acid, wherein ammonium is utilized as an alkaline component in the washing solution, and wherein ammonium imidodisulfonate, contained in said partial flow and separated therefrom and washed in said at least single washing, is used as a mineral fertilizer.

2. The method as defined in claim 1, wherein between 0.3 and 3.0 volume percent of the washing solution is branched from the washing solution flowing in the closed cycle for the separation of imidodisulfonate therefrom.

3. The method as defined in claim 1, wherein imidodisulfonate is subjected to a multiple washing.

4. The method as defined in claim 1, further including the steps of treating the separated and washed imidodisulfonate with hot exhaust gases having temperature from 350° to 400° C. to decompose said separated and washed imidodisulfonate, and separating a remaining sulfate-sulfite mixture and converting it into gypsum; and adding a sulfurdioxide and nitrogen-containing gas obtained in a decomposition reaction to the exhaust gases before the latter enters a gas washer.

* * * * *